3,042,662
PROCESS FOR HALOGENATING COPOLYMERS
Delmer L. Cottle, Highland Park, Leon S. Minckler, Jr., Metuchen, and Theodore Lemiszka, Roselle, N.J., assignors to Esso Research and Engineering Company, a corporation of Delaware
No Drawing. Filed May 26, 1959, Ser. No. 815,830
6 Claims. (Cl. 260—85.3)

This invention relates to halogenating butyl rubber in the presence of alcohols or ethers. Heretofore, butyl rubber has been carefully brominated or chlorinated with gaseous, liquid and solid halogenating agents to contain critically small amounts of combined halogen. Such halogenated isoolefin-multiolefin butyl rubber type copolymers have been found to be vulcanizable with zinc oxide alone and covulcanizable with high unsaturation rubbers such as natural rubber and/or diene-styrene copolymer rubbers to produce improved tires, steam hose, conveyor belting and other rubber articles.

Whether the solid butyl rubber copolymer is halogenated per se or the copolymer is first dissolved in an inert solvent and then halogenated, some molecular weight breakdown of the copolymer usually occurs. Also, if more than critically small amounts of halogen as abovementioned are combined with butyl rubber, drastic molecular weight degradation ensues.

It has been proposed to halogenate butyl rubber in the presence of water in order to reduce molecular weight breakdown of the rubber during halogenation. Although water serves this purpose, the halogenation rate is undesirably slowed.

In accordance with the present invention, the abovementioned disadvantages are overcome and undegraded halogenated butyl rubbers are produced at an accelerated rate by dissolving the butyl rubber in a solvent, adding thereto an alcohol and/or ether, agitating the resulting mixture, and contacting with the particular halogenating agent or agents desired. In practicing the present invention, the amount of alcohol and/or ether present is about 0.001 to 100, advantageously about 0.01 to 40, and preferably about 0.1 to 10.0 parts by weight per 100 parts by weight of butyl rubber.

Butyl rubber copolymers comprise a major proportion (preferably about 85.0 to 99.5 weight percent) of a $C_4$ to $C_8$ isoolefin such as isobutylene, 2-methyl-1-butene or 3-methyl-1-pentene, etc., with a minor proportion (preferably about 15 to 0.5 weight percent) of a multiolefin of about 4 to 14, preferably of about 4 to 6 carbon atoms, and are commonly referred to in patents and technical literature as "butyl rubber," or GR-I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, myrcene, dimethallyl, allo-ocimene, vinyl fulvenes, etc. The copolymer comprising isobutylene and isoprene is preferred, although the copolymer may contain about 0.05 to 20.0, preferably about 0.2 to 5.0, parts by weight based on total reacting co-monomers of such mono-olefinic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 150,000 to 2,000,000 and an iodine No. between about 0.5 and 50, preferably about 1 to 20.

In producing halogenated butyl rubber in accordance with the present invention, unmodified, unvulcanized butyl rubber is carefully halogenated in the presence of the above-described amounts of an alcohol and/or ether until it contains at least about 0.5 weight percent (preferably at least about 1.0 weight percent), but not more than about "X" weight percent of combined fluorine or chlorine or 3.0 "X" weight percent combined bromine or iodine wherein:

$$X = \frac{M_3 L}{(100-L)M_1 + L(M_2+M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of the halogen Preferably, there should be at least about 0.5 weight percent of combined halogen in the polymer but not more than about 1 atom of fluorine or chlorine or 3 atoms of bromine or iodine combined in the polymer per molecule of multiolefin present therein; i.e., per double bond in the polymer.

Suitable halogenating agents which may be employed are gaseous chlorine, liquid bromine, iodine monochloride, hydrogen fluoride, alkali metal hypochlorites or hypobromites, sulfur chlorides or bromides (particularly oxygenated sulfur chlorides or bromides), pyridinium chloride perchloride, N-bromosuccinimide, tri-bromophenol bromide, N-chloroacetamide, N,N'-dimethyl-5,5-dichloro or dibromo hydantoin, and other common halogenating agents.

The halogenation is generally conducted at about −50° C. to about +150° C., advantageously at about 0° to 65° C., preferably at about 15° to 50° C. (room temperature being generally satisfactory), depending upon the particular halogenating agent, for about one minute to several (e.g., 5) hours. An advantageous pressure range is from about 0.5 to 400 p.s.i.a.; atmospheric pressure being satisfactory. The halogenation conditions are regulated to halogenate the rubbery copolymer to the extent above mentioned.

According to the present invention, there is prepared a solution of the copolymer as above, in a suitable inert liquid organic solvent such as a $C_3$ to $C_{10}$, or preferably, a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc. To this solution is then added the alcohol and/or ether and the resulting dispersion contacted with gaseous chlorine, liquid bromine or other halogenating agent which may be optionally dissolved in an inert solvent with or without being also dispersed into an alcohol and/or ether.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber copolymer may be recovered in various manners. The polymer may be precipitated with acetone, or any other known non-solvent for the halogenated butyl rubber, and dried under about 1 to 760 millimeters or higher of mercury pressure absolute at about 0° to 180° C., preferably at about 50° to 150° C. (e.g., 70° C.). Other methods of recovering the halogenated butyl rubber polymer from say a hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, drying and extruding procedures. The halogenated copolymer formed advantageously has a viscosity average molecular weight of about 200,000 to 1,500,000 (i.e., about the same as the unhalogenated copolymer) and a mole percent unsaturation of about 0.5 to 15.0. It may be vulcanized in the presence of conventional rubber curatives for about 1 minute to 5 hours at about 250° to 400° F. to produce excellent products.

Typical alcohols useful for the purposes of the present invention include, among others, methanol, isopropanol, t-butyl alcohol, 1-propanol, isobutyl alcohol, the pentanols, 2-ethylhexanol, "iso" octyl alcohols, etc. Useful ethers comprise ethyl ether, methyl ether, diisopropyl ether, di-n-butyl ether, methyl t-butyl ether, ethyl t-amyl ether, ethyl isopropyl ether mixtures thereof, etc.

In order to more fully illustrate but not to limit the present invention, the following experimental data are given:

*Example 1*

Four samples, each of 100 parts by weight of an isobutylene-isoprene butyl rubber copolymer were each dissolved to form a 12.8 weight percent solution in aluminum chloride treated hexane. Each butyl rubber had an iodine number of 11.2 and an intrinsic viscosity of 1.46 corresponding to a Mooney viscosity at 212° F. for 8 minutes of 75 and a viscosity average molecular weight of 500,000. Each dissolved sample was reacted with 5 parts by weight of liquid bromine at room temperature for 2 hours both in the presence and absence of 3.9 to 4.8 parts by weight of added alcohols and ethers with the following results:

| Sample | A | B | C | (Control) D |
|---|---|---|---|---|
| Added Compound | 4.8 t-butyl alcohol. | 3.9 isopropyl alcohol. | 4.8 ethyl ether. | None |
| INTRINSIC VISCOSITY OF HALOGENATED PRODUCT | | | | |
| Reaction Time (Min.): | | | | |
| 3 | 1.37 | 1.39 | 1.40 | 1.40 |
| 10 | 1.36 | 1.43 | 1.39 | 1.36 |
| 30 | 1.29 | 1.40 | 1.40 | 1.24 |
| 60 | 1.23 | 1.37 | 1.37 | 1.05 |
| 120 | 1.34 | 1.39 | | 0.91 |
| BROMINE CONTENT OF HALOGENATED PRODUCT | | | | |
| 3 | 2.05 | 2.02 | 1.99 | 2.02 |
| 10 | 2.03 | 2.06 | 2.00 | 2.19 |
| 30 | 2.10 | 2.24 | 2.10 | 2.01 |
| 60 | 2.05 | 2.13 | 2.34 | 2.09 |
| 120 | 2.06 | 2.18 | | 2.10 |

The above data show that the halogenation of butyl rubber in the presence of added alcohols or ethers prevents molecular weight degradation (i.e., there is no appreciable loss in intrinsic viscosity) and halogenates the butyl rubber copolymer as rapidly as halogenation in the absence of alcohols or ethers. It is also noted that halogenation in the absence of alcohols or ethers (sample D) results in molecular weight degradation as shown by a decrease in intrinsic viscosity of the halogenated product from a value of 1.40 down to 0.91.

Resort may be had to modifications and variations of the disclosed embodiments without departing from the spirit of the invention or the scope of the appended claims.

What is claimed is:

1. A process for halogenating butyl rubber, a copolymer of a major portion of a $C_4$ to $C_8$ isoolefin and a minor portion of a $C_4$ to $C_{14}$ multiolefin, which comprises dissolving isoolefin-multiolefin butyl rubber in a solvent, admixing therewith 0.01 to 40 parts by weight per 100 parts by weight of butyl rubber of a molecular weight stabilizer selected from the group consisting of aliphatic alcohols, aliphatic ethers and mixtures thereof so as to form a solution of butyl rubber particles and halogenating the butyl rubber while thus in the presence of the stabilizer.

2. A process according to claim 1 in which the amount of stabilizer present is between about 0.01 and 10.0 parts by weight per 100 parts by weight of isoolefin-multiolefin copolymer.

3. A process according to claim 1 in which the halogenation reaction is at about −50° C. to about +150° C. for between about one minute and five hours.

4. A process according to claim 1 in which the halogen is chlorine.

5. A process according to claim 1 in which the halogen is bromine.

6. A process for halogenating a butyl rubber copolymer of a major portion of a $C_4$ to $C_8$ isoolefin and a minor portion of a $C_4$ to $C_{14}$ multiolefin with a halogenating agent selected from the group consisting of chlorinating and brominating agents which comprises, dissolving said butyl rubber copolymer in a $C_3$ to $C_{10}$ inert solvent, admixing therewith 0.1 to 10 parts by weight per 100 parts by weight of copolymer of a molecular weight stabilizer selected from the group consisting of aliphatic alcohols, aliphatic ethers, and mixtures thereof, and halogenating said butyl rubber copolymer at a temperature of 0 to 65° C. and in the presence of said stabilizer with a member of the group consisting of chlorinating and brominating agents until said copolymer contains at least 0.5 wt. percent halogen but no more than 3 atoms of halogen per double bond in said copolymer.

References Cited in the file of this patent

UNITED STATES PATENTS

| | | |
|---|---|---|
| 2,585,506 | Shokal et al. | Feb. 12, 1952 |
| 2,831,839 | Canterino et al. | Apr. 22, 1958 |
| 2,891,595 | Kuntz et al. | June 23, 1959 |